C. W. GRESSLE.
VEHICLE WHEEL RIM.
APPLICATION FILED MAY 6, 1913.
1,112,603.  Patented Oct. 6, 1914.
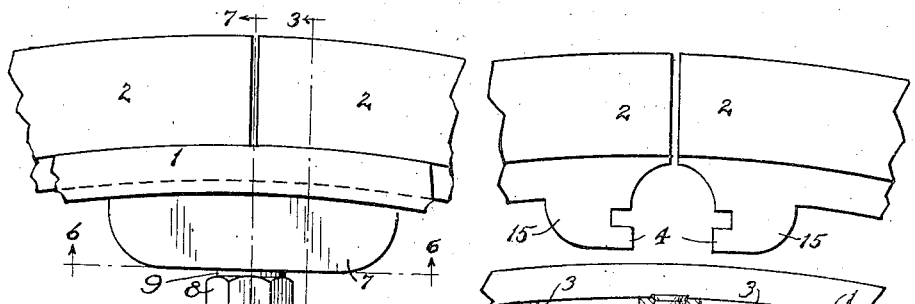
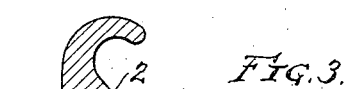
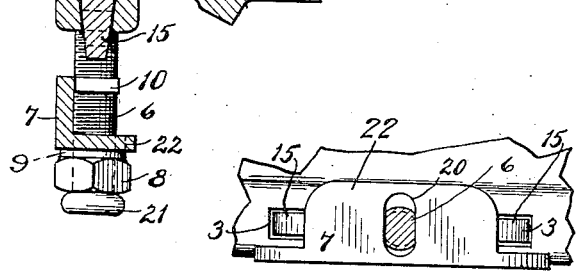
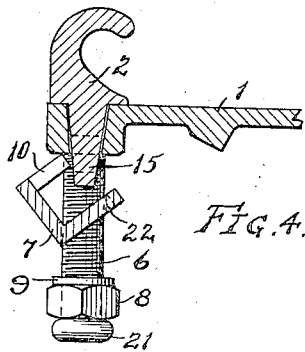
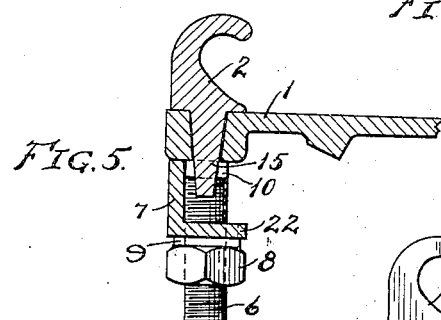
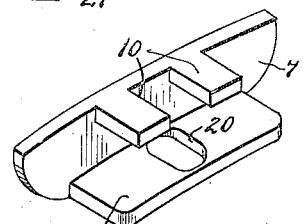
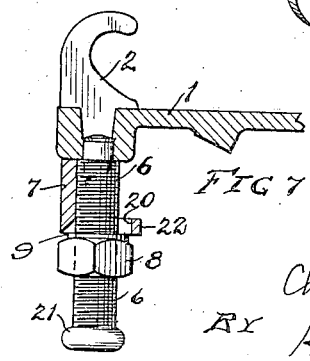
WITNESSES:
Justin W. Macklin
R. L. Bruck
INVENTOR:
Charles W. Gressle
BY Hull & Smith
ATT'YS

UNITED STATES PATENT OFFICE.

CHARLES W. GRESSLE, OF CLEVELAND, OHIO, ASSIGNOR, BY MESNE ASSIGNMENTS, TO THE STANDARD WELDING COMPANY, OF CLEVELAND, OHIO, A CORPORATION OF OHIO.

VEHICLE WHEEL-RIM.

1,112,603.

Specification of Letters Patent.

Patented Oct. 6, 1914.

Application filed May 6, 1913. Serial No. 765,745.

*To all whom it may concern:*

Be it known that I, CHARLES W. GRESSLE, a citizen of the United States, residing at Cleveland, in the county of Cuyahoga and State of Ohio, have invented a certain new and useful Improvement in Vehicle Wheel-Rims, of which the following is a full, clear, and exact description, reference being had to the accompanying drawings.

The present invention relates to a vehicle rim, and particularly to the means for securely clamping or locking the ends of a split tire retaining flange to be used, of course, chiefly in holding pneumatic or solid rubber tires upon a rim.

To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of the various mechanical forms in which the principle of the invention may be used.

In said annexed drawing: Figure 1 is a side elevation of a portion of a rim showing my improved device in position engaging the tire flange; Fig. 2 is a view similar to Fig. 1, but showing the locking means in disengaged position; Fig. 3 is a transverse section on the line 3—3, Fig. 1, but showing the locking means in its disengaged position; Fig. 4 is a view similar to Fig. 3, but showing the locking means in a tilted position ready to engage the lugs on the tire flanges; Fig. 5 is a view similar to Figs. 3 and 4, showing the locking means in engaging position; Fig. 6 is a section, on the line 6—6, Fig. 1, through the guide for the locking clamp, showing the latter in position thereon, and Fig. 7 is a section on the line 7—7, Fig. 1; and Fig. 8 is a perspective view of the locking member.

In Fig. 1, I show a rim 1 adapted to be suitably engaged upon a felly (not shown) in the usual manner. Upon the rim section there are provided two side flanges for engaging the edges of the tire shoe. Of these, only one is here shown, such flange 2 being of the reversible type and removably secured to the rim in the fashion now to be described. This said second flange is transversely split, and the adjacent ends are formed with downwardly projecting lugs 15 adapted to enter apertures 3 in the rim, such lugs being formed with shoulders 4 which project laterally from the body of the lug, preferably toward each other, as shown. Between the apertures or openings 3 in the rim I provide an inwardly extending projection or guide, preferably threaded to form a bolt 6, and upon this guide I mount a clamp or locking member 7 which is both slidably and pivotally mounted thereon so as to be bodily movable toward and from the rim as also oscillatory about an axis substantially parallel to a tangent to said rim at an adjacent point thereon. This form of engagement between member 7 and 6 is shown as being secured by forming in the member an elongated slot 20 of length greater than the diameter of the screw, the slot being substantially rectangular and having its greatest dimensions at right angles to the greatest dimension of the clamping member. The outer end of the screw is enlarged, as at 21, to prevent the disengagement of a nut 8 which is adjustably threaded upon the screw to retain the clamp in its desired position, a collar or washer 9 being interposed between the guide and the nut. The slotted portion of the clamp or locking member 7 is in the form of a flange 22 against which the nut 8, or rather washer 9, engages, and said member is further provided with two laterally projecting lugs or shoulders 10 parallel with, but spaced from, such flange and disposed one on each side of the slot. When it is desired to lock the tire engaging flange onto the rim, such flange is properly placed in position for the lugs to engage the openings in the rim, as shown in Fig. 2, the locking member being then in its lower position, in which it is entirely disengaged from the lugs 15. The member is then tilted or pivoted about the screw and moved bodily on the latter until it is thrown into the position shown in Fig. 4, where the lugs or shoulders 10 on said member are at the proper level to engage the shoulders 4 upon the lugs 15. Thereupon the clamp is tilted back into vertical position upon the guide, when the shoulders 10 will engage with the shoulders 4 on the lugs 15, and securely lock the same against disengagement from the apertures 3 in the rim. It is then only necessary to adjust the nut 8 to retain the clamp in such position, which absolutely prevents disengagement of the tire-engaging flange from the rim.

The device possesses the advantage of being easy to operate and simple to construct while its permanent attachment to the rim secures against acidental loss either when the wheel is in operation, or when the flange is detached incidentally to changing a tire.

Having thus described my invention, what I claim is:—

1. In a wheel, the combination with a tire-supporting rim and a split side-flange removably mounted on said rim; of means for locking said flange in place, said means including a lug on said flange adapted to project inside of said rim; and a locking member attached to said rim so as to be bodily movable toward and away from the same, said member also being oscillatory into and out of engagement with the lug on said flange.

2. In a wheel, the combination with a tire-supporting rim and a split side-flange removably mounted on said rim; of means for locking said flange in place, said means including a lug on said flange adapted to project inside of said rim; and a locking member attached to said rim so as to be bodily movable toward and away from the same, said member also being oscillatory about an axis substantially parallel to a tangent to said rim at an adjacent point thereon and adapted in one position to engage the lug on said flange and thereby secure the latter in place.

3. In a wheel, the combination with a tire-supporting rim and a split side-flange removably mounted on said rim; of means for locking said flange in place, said means including a lug on said flange adapted to project inside of said rim, said lug being provided with a shoulder; and a locking member attached to said rim so as to be bodily movable toward and away from the same, said member also being oscillatory about an axis substantially parallel to a tangent to said rim at an adjacent point thereon, and being adapted in one position to engage the shoulder on said lug.

4. In a wheel, the combination with a tire-supporting rim and a split side-flange removably mounted on said rim; of means for locking said flange in place, said means including a lug on said flange adapted to project inside of said rim, said lug being provided with a shoulder; a locking member attached to said rim so as to be bodily movable toward and away from the same, said member also being oscillatory about an axis substantially parallel to a tangent to said rim at an adjacent point thereon, and being adapted in one position to engage the shoulder on said lug; and means adapted to retain said member in such engaging position.

5. In a wheel, the combination with a tire-supporting rim and a split side-flange removably mounted on said rim; of means for locking said flange in place, said means including a lug on said flange adapted to project inside of said rim, said lug being provided with a shoulder; a locking member attached to said rim so as to be bodily movable toward and away from the same, said member also being oscillatory about an axis substantially parallel to a tangent to said rim at an adjacent point thereon, and being adapted in one position to engage the shoulder on said lug; and bolt and nut means adapted to retain said member in such engaging position.

6. In a wheel, the combination of a tire-supporting rim; a split side-flange removably mounted on said rim; lugs on said flange near its respective ends adapted to project inside of said rim; and a locking member attached to the inside of said rim at a point between such projecting lugs, so as to be bodily movable toward and away from said rim, said member also being oscillatory into and out of engagement with said lugs.

7. In a wheel, the combination of a tire-supporting rim; a split side-flange removably mounted on said rim; lugs on said flange near its respective ends adapted to project inside of said rim; and a locking member attached to the inside of said rim at a point between such projecting lugs, so as to be bodily movable toward and away from said rim, said member also being oscillatory about an axis substantially parallel to a tangent to said rim at an adjacent point thereon and adapted in one position to engage the lugs on said flange and thereby secure the latter in place.

8. In a wheel, the combination of a tire-supporting rim having two alined openings adjacent to each other; a split side-flange removably mounted on said rim; two lugs on said flange, one near each end, respectively adapted to project through such openings, said lugs being provided with shoulders on their adjacent faces; and a locking member attached to said rim between said openings so as to be bodily movable toward and away from the same, said member also being oscillatory into and out of engagement with the lugs on said flange.

9. In a wheel, the combination of a tire-supporting rim having two alined openings adjacent to each other; a split side-flange removably mounted on said rim; two lugs on said flange, one near each end, respectively adapted to project through such openings, said lugs being provided with shoulders on their adjacent faces; a locking member attached to said rim between said openings so as to be bodily movable toward and away from the same, said member also being oscillatory into and out of engagement with the lugs on said flange; and means adapted to retain said member in such engaging position.

10. In a wheel, the combination of a tire-supporting rim, having an encircling groove with two alined openings adjacent each other in the bottom of such groove; a split side-flange adapted to removably seat in such groove; two lugs on said flange, one near each end, respectively adapted to project through one of the openings in such groove, said lugs being provided with shoulders on their adjacent faces; an inwardly extending threaded projection on said rim between such openings; a locking member attached to said projection so as to be bodily movable toward and away from said rim and also oscillatory about an axis substantially parallel to a tangent to said rim at an adjacent point thereon; shoulders on said locking member adapted in one position of the latter to engage the shoulders on said lugs and thereby secure said flange in place; and a nut on said projection for retaining said locking member in such engaging position.

11. In a wheel, the combination of a rim having two adjacently disposed openings, a split tire-engaging flange removably mounted on said rim with its ends opposite such openings, lugs on the ends of said flange, said lugs extending through such openings, shoulders on said lugs, a threaded guide attached to said rim between such openings and projecting from said rim parallel to said extending lugs, a locking clamp provided with a slot of greater size than said guide, said clamp being disposed on said guide so as to be slidably and pivotally movable thereon, lateral shoulders on said clamp adapted to engage such shoulders on said lugs upon movement of said clamp into one position, and a nut adjustably mounted on said guide to maintain said member in such position.

12. In a wheel, the combination of a rim having two adjacently disposed openings, a split tire-engaging flange removably mounted on said rim with its ends opposite such openings, lugs on the ends of said flange, said lugs extending through such openings, shoulders on said lugs, a threaded guide attached to said rim between such openings and projecting from said rim parallel to said extending lugs, a locking clamp provided with a slot of greater size than said guide, said clamp being disposed on said guide so as to be slidably and pivotally movable thereon, lateral shoulders on said clamp adapted to engage such shoulders on said lugs upon movement of said clamp into one position, a nut adjustably mounted on said guide to maintain said member in such position, and a projection fixedly attached to the extending end of said guide and adapted to prevent loss of said nut.

In testimony whereof, I hereunto affix my signature in the presence of two witnesses.

CHARLES W. GRESSLE.

Witnesses:
RICHARD S. BRYANT,
CHAS. W. SCHRIMSHAW.